(12) United States Patent
Diprizio et al.

(10) Patent No.: US 6,384,727 B1
(45) Date of Patent: May 7, 2002

(54) CAPACITIVELY POWERED RADIO FREQUENCY IDENTIFICATION DEVICE

(75) Inventors: Giuseppe Mario Diprizio, Chicago; Timothy James Collins, Lockport; Patrick L. Rakers, Kildeer, all of IL (US); Victor Vega, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/630,987

(22) Filed: Aug. 2, 2000

(51) Int. Cl.[7] .............................................. G08B 13/14
(52) U.S. Cl. ..................... 340/572.7; 29/846
(58) Field of Search ........................... 340/572.7, 572.1; 29/600, 825, 829, 846

(56) References Cited

U.S. PATENT DOCUMENTS

| | | | |
|---|---|---|---|
| 5,099,227 A | * 3/1992 | Geiszler et al. | 340/572.1 |
| 5,528,222 A | 6/1996 | Moskowitz et al. | 340/572.7 |
| 5,566,441 A | 10/1996 | Marsh et al. | 29/600 |
| 5,973,598 A | * 10/1999 | Beigel | 340/572.1 |
| 6,018,299 A | 1/2000 | Eberhardt | |
| 6,040,773 A | * 3/2000 | Vega et al. | 340/572.1 |
| 6,091,332 A | 7/2000 | Eberhardt et al. | |
| 6,094,138 A | 7/2000 | Eberhardt et al. | |
| 6,107,920 A | * 8/2000 | Eberhardt et al. | 340/572.7 |
| 6,130,613 A | 10/2000 | Eberhardt et al. | |
| 6,133,835 A | * 10/2000 | De Leeuw et al. | 340/572.5 |
| 6,147,605 A | 11/2000 | Vega et al. | |
| 6,181,287 B1 | * 1/2001 | Beigel | 343/741 |
| 6,252,508 B1 | 6/2001 | Vega et al. | |

OTHER PUBLICATIONS

Philips Research Press Release 97005e, Dec. 1997 (http://www.research.philips.com/pressmedia/releases/97005e1.html).

* cited by examiner

*Primary Examiner*—Thomas Mullen
(74) *Attorney, Agent, or Firm*—Terri S. Hughes

(57) ABSTRACT

A capacitively powered radio frequency identification device (10) comprises a substrate (12), a conductive pattern (14, 16) and a circuit (18). The substrate (12) has a first surface and a second surface. The conductive pattern is formed on the first surface of the substrate (12). The conductive pattern has a first electrode (14) and a second electrode (16). The first and second electrodes (14, 16) are isolated from each other by a non-conductive region disposed therebetween. The circuit (18) comprises polymers. The circuit (18) is electrically coupled to the first electrode (14) and the second electrode (16).

15 Claims, 3 Drawing Sheets

CAPACITIVELY POWERED RADIO FREQUENCY IDENTIFICATION DEVICE

FIELD OF THE INVENTION

The present invention relates generally to a capacitively powered radio frequency identification device for use in a wireless data communication system.

BACKGROUND OF THE INVENTION

Remotely powered electronic devices and related systems are known. For example, U.S. Pat. No. 5,099,277 issued to Geiszler et al. titled "Proximity Detecting Apparatus", discloses a remotely powered device which uses electromagnetic coupling to derive power from a remote power source and then uses both electromagnetic and capacitive coupling to transmit stored data to a receiver often collocated with the remote power source. Such remotely powered communication systems are commonly known in the field of radio frequency identification ("RFID"). In such systems, the remote power source is commonly known as a "reader, or an exciter," while the remotely powered portable device is commonly known as a "RFID tag".

Earlier RFID tags and systems primarily used electromagnetic coupling to power the RFID tag and couple the RFID tag with an exciter system and its associated receiver. The exciter generates an electromagnetic excitation signal used to power the RFID tag and cause the device to transmit a signal including stored information. The receiver then receives the signal produced by the RFID tag to demodulate and recover the data.

Known electromagnetic coupling mechanisms include an oscillator as part of the exciter and a coil antenna on both the exciter and the RFID tag. The RFID tag typically includes an electronic circuit, such as an integrated circuit and memory. By way of example, in an earlier system, excitation circuitry is connected to a coil antenna, which radiates excitation signals that are picked up by a coil antenna mounted on a tag that contains the electronic circuit. The excitation signals energize the circuit, when then provides an information-carrying signal that is transmitted to the receiver using electromagnetic or capacitive coupling.

One problem with the use of electromagnetic coupling between a RFID tag and either an exciter or a receiver has been the complexity involved in the manufacture of tags that employ a coil antenna. The spiral layout of a typical coil antenna makes the tag more difficult to produce and increases tag cost and size. The coil antennas require tight tolerances for efficient performance. Additionally, typical coil antennas have undesirable thermal compression characteristics that affect, in particular, the ability to create a flat tag or remote device that encompasses the coil.

RFID tags and associated systems have numerous uses. By way of example, RFID tags are frequently used for personal identification in automated gate sentry applications protecting secured buildings or areas. These tags often take the form of access control cards. Information stored on the RFID tag identifies the person seeking access to the secured building or area. Older automated gate sentry applications require the person accessing the building to insert or swipe their identification tag into or through a reader for the system to read the information from the identification tag. Newer RFID tag systems allow the tag to be read at a distance, thereby eliminating the need to insert or swipe an identification tag into or through a reader. Most typically, the user simply holds or places the tag near or in proximity to the reader or base station, which is coupled to a security system securing the building or area. The base station transmits an excitation signal to the tag that powers circuitry contained on the tag. The circuitry, in response to the excitation signal, communicates stored information from the tag to the base station, which receives and decodes the information. The information read is used by the security system to determine if access is appropriate. Also, RFID tags may be written remotely by an excitation signal appropriately modulated in a predetermined manner.

In addition to typical applications for access control of persons, RFID tags may be useful in electronic animal identification, baggage tracking, parcel tracking, inventory management applications, asset identification and tracking, personal computer access and security, and other applications involving identification of things. These applications involve transmitting stored information from a tag to an exciter/reader when the tag is brought within the excitation field of the exciter/reader. Also, these applications may involve writing information to a tag. RFID tags for these applications may need to be durable for long-term use or disposable, for temporary use.

In applications for identification of persons and things, bar codes are almost universally employed. Generation of the bar code is very inexpensive. However, one problem associated with bar codes and bar code readers is that the bar codes must be precisely aligned with the bar code reader in order to be read. Another problem with bar codes is that the bar codes may become unreadable as a result of damage, for example, exposure to moisture, or wear and tear from use. RFID tags address some of the shortcomings of bar codes.

In addition to the need to transmit stored information via radio frequency transmission, it is often desirable for an RFID tag to be very thin, very flat, flexible, semi-flexible, or rigid and to nevertheless be compatible with printing technologies, including but not limited to die sublimation printing, ink jet printing, and flexographic printing and the like. Prior RFID tags incorporating coils are limited in their ability to be flat and thin and low in cost. This has greatly limited their application in the market place, particularly in areas where the cost of the tag must be competitive with a barcode.

Thus, there is a need for a thin, flat, inexpensive RFID device.

BRIEF DESCRIPTION OF THE DRAWINGS

A preferred embodiment of the invention is now described, by way of example only, with reference to the accompanying figures in which.

DETAILED DESCRIPTION OF THE PREFERRED EMBODIMENT

Figure 1:
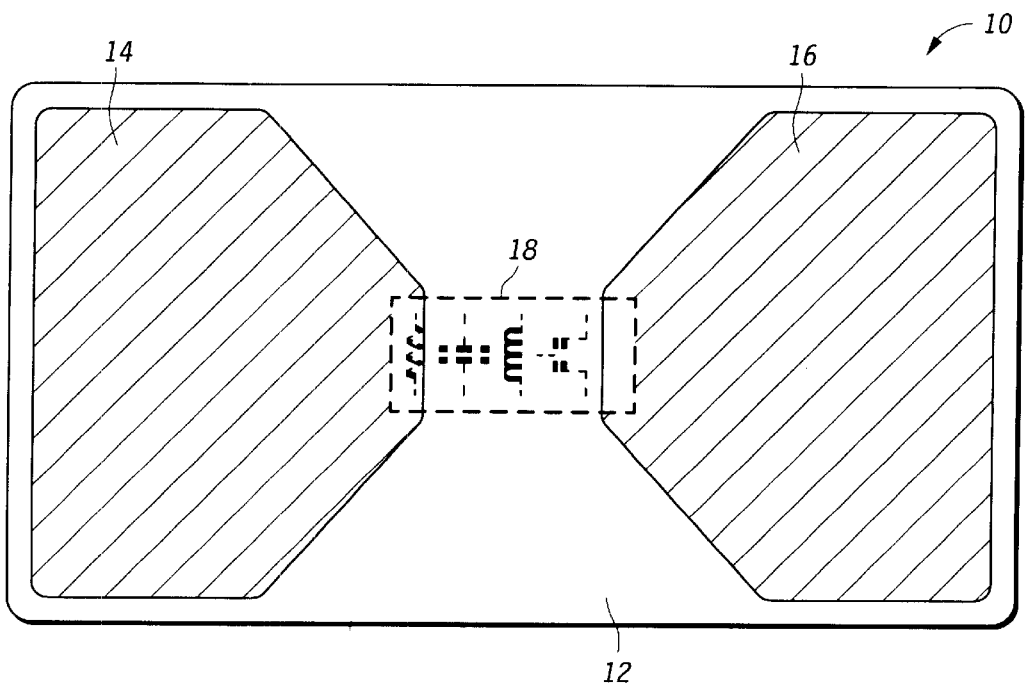
FIG. 1 is a plan view of a RFID device in accordance with a preferred embodiment of the present invention.

While the specification concludes with claims defining the features of the invention that are regarded as novel, it is believed that the invention will be better understood from a consideration of the following description in conjunction with the figures, in which like reference numerals are carried forward.

FIG. 1 shows a capacitively powered RFID device ("device") 10 in accordance with the present invention. Device 10 (e.g., a tag) has a myriad of uses in applications for identifying persons, places, or things. Device 10 comprises a substrate 12, a conductive pattern having a first electrode 14 and a second electrode 16, and a circuit 18.

Substrate 12 provides a base for holding the components of device 10. Substrate 12 has at least a first surface and a second surface. Substrate 12 is composed of any non-conductive component. Suitable materials for substrate 12 include, but are not limited to, paper, acetate, polyester, polyethylene, polypropylene, polypropylene with calcium carbonate, a polyimide foil with a conducting polyaniline layer containing a photoinitiator, polyvinyl chloride, acrylonitrile butadiene styrene (ABS), plastic, wood, glass, textiles, ceramics, or the like.

The selection of material for substrate 12 will vary depending upon the application. For example, in an application wherein device 10 is disposable, substrate 12 is preferably paper. For an application where device 10 is durable and reusable, for example as an access control card, substrate 12 is preferably plastic, polyvinyl chloride or polyester. In an application where device 10 is integrated into an article of manufacture, substrate 12 can be any non-conductive or substantially non-conductive material. Notwithstanding the above, it will be appreciated by those skilled in the art that any suitable substrate may be used such as polymer-based, non-polymer-based, organic or inorganic substrate.

Substrate 12 may alternatively be formed from a web of material or from discrete portions of a material. The preferred form of material used for substrate 12 varies depending on the application for device 10 and the process used to manufacture device 10. For example, for manufacture of device 10 using a web printing process, substrate 12 is preferably formed from a rolled web of paper or other material. Alternatively, for example, substrate 12 may be formed from a fan-folded web of paper or other material.

A conductive pattern is formed on the first surface of the substrate 12. The conductive pattern comprises a first electrode 14 and a second electrode 16. The first and second electrodes 14, 16 are electrically isolated from each other by a non-conductive region disposed therebetween. First and second electrodes 14, 16 are formed from numerous suitable conductive materials. The conductivity of electrodes 14, 16 may vary considerably with little or no performance degradation. For example, electrodes 14, 16 with conductivity from 0 ohms per square to 500 K-ohms per square are operable for read-only and read/write applications. Suitable materials for electrodes 14, 16 include conductive inks, semi-conductive materials, conductive and semi-conductive polymers, or metallic materials like wire or metal foil. More specifically, suitable materials for electrode elements 14, 16 include copper, graphite, metalized polyester, aluminum, silver, gold, metalized ink, ferrophosphide, graphite, carbon doped inks, carbon nanotubes or carbon fullerenes (e.g., C60, etc.), conjugated semiconducting polymer (e.g., polythiophene, etc.), a high-density pi-bond organic oligomer (e.g., pentacene, etc.), self assembled nanoparticles (e.g., CdSe, ZnO, etc.), a ceramic filled polymer dielectric (e.g., BaTiO, etc.), or the like. Electrode elements 14, 16 are formed on substrate 12 using any suitable process including printing, lamination, adhesively securing, and deposition. The shape of electrodes 14, 16 is not limited, but preferably, for optimal performance, antenna elements 14, 16 consume substantially all of the available surface area of the first surface of substrate 12.

The circuit 18 contains the electronics associated with the device 10 and is electrically coupled to the first and second electrodes 14, 16. The circuit 18 is preferably programmed with information or may receive data from a reader/exciter (not shown) for later storage in memory. Typically, the circuit 18 is comprised of silicon with conducting and insulating regions disposed therein to create discrete components and interconnects, as known in the art. Alternatively, the circuit 18 may comprise polymers with conducting and insulating regions disposed on a carrier to create the aforementioned components (e.g., resistors, capacitors, inductors, etc.). In addition, the conductive and insulating regions may be disposed on a carrier to form an active component, such as a transistor.

In accordance with the preferred embodiment, both the active and discrete components of the present invention are made from printable materials, such as, carbon nanotubes or carbon fullerenes (e.g., C60, etc.), conjugated semiconducting polymer (e.g., polythiophene, etc.), a high-density pi-bond organic oligomer (e.g., pentacene, etc.), self assembled nanoparticles (e.g., CdSe, ZnO, etc.), a ceramic filled polymer dielectric (e.g., BaTiO, etc.), and the like. In addition, the circuit 18 of the present invention is printed onto the substrate 12. The polymer-based circuits of the present invention are generally more flexible and lower in cost when compared to the silicon-based integrated circuits. Moreover, the polymer-based circuit 18 of the present invention is ideally suited for integration into or attachment onto both flexible and rigid products, such as, for example, the product packages, labels, forms, identification tags and cards made from papers, fabric, glass, wood, plastics, rubber, and other flexible and rigid non-conductive materials.

Figure 2:
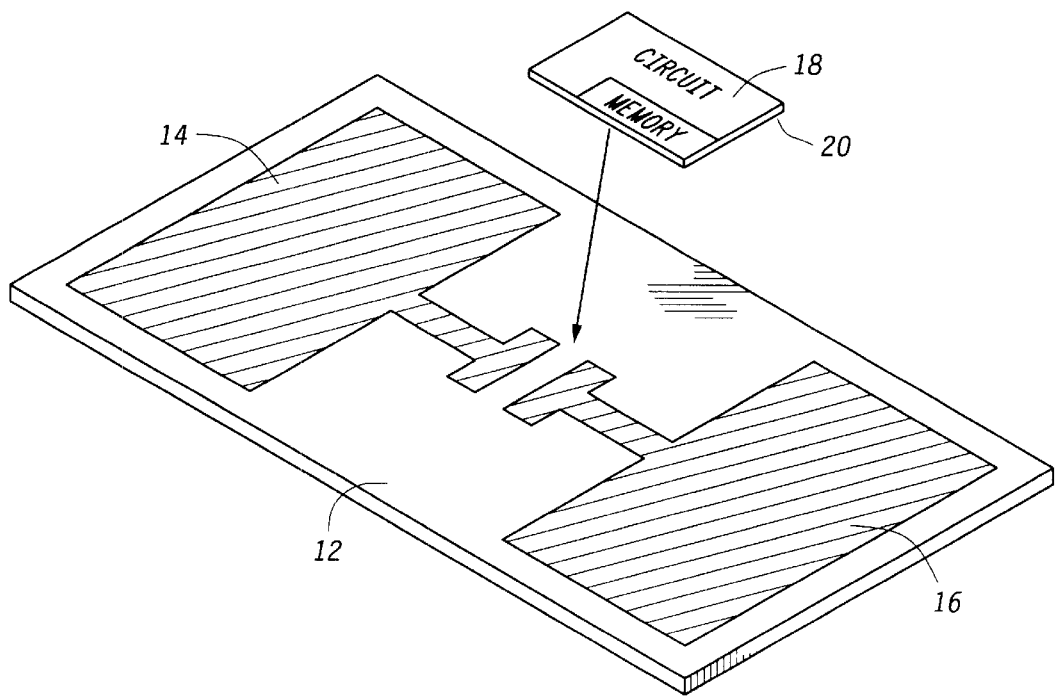
FIG. 2 is a plan view of the RFID device in accordance with an alternative embodiment of the present invention.
Figure 3:
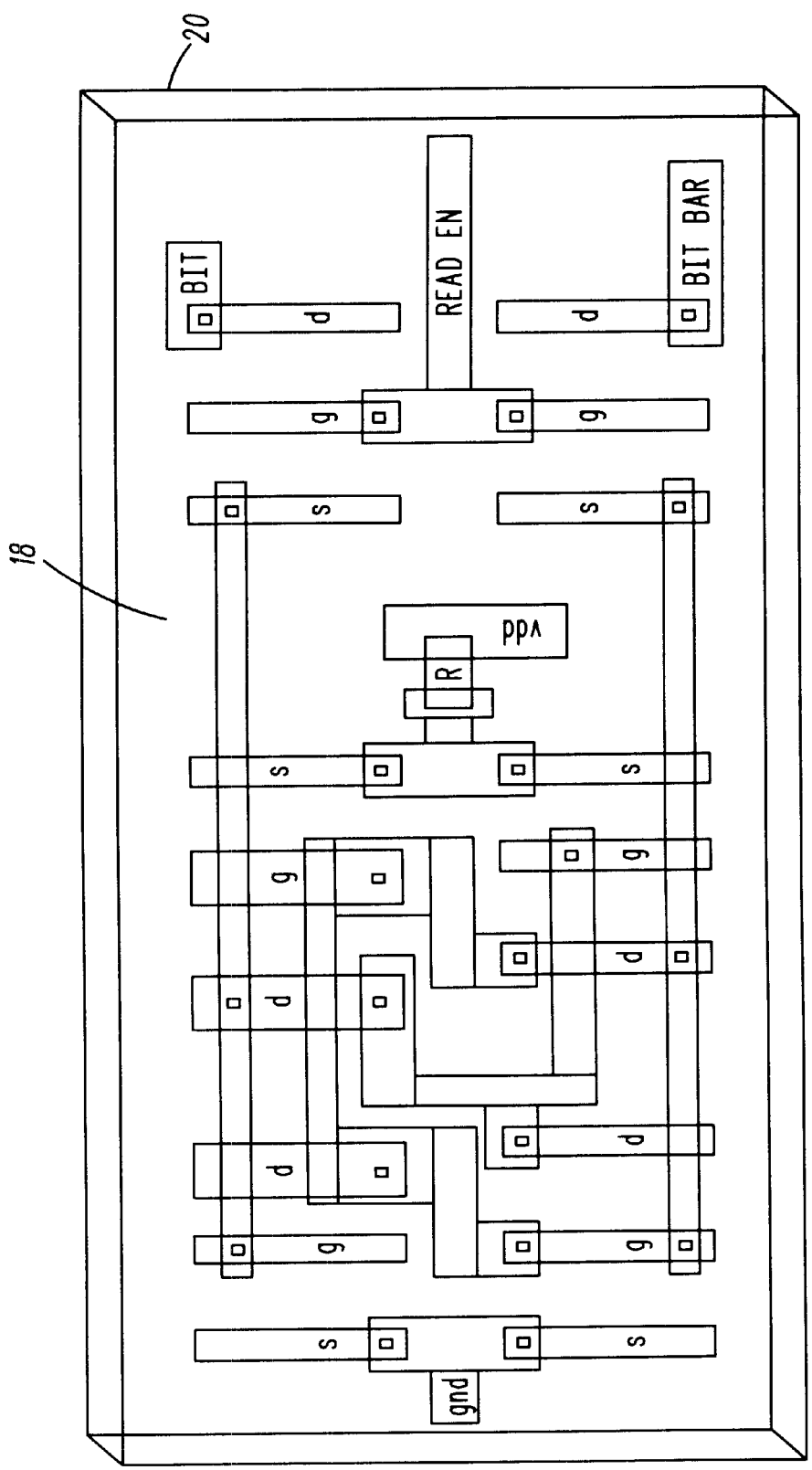
FIG. 3 is a plan view of a printable memory comprising conductive and insulating regions in accordance with the preferred embodiment of the present invention.

Preferably, the circuit 18 comprises printable polymers, as shown in FIG. 3, that are printed onto the substrate 12 and electrically coupled to the first and second electrodes 14, 16. As shown, a printed memory 22 comprises printable polymer transistors 24, 26, etc. Each polymer transistor comprises a conductive source 28, drain 30, and gate 32. An insulating layer (not shown) typically covers at least a portion of the substrate 12 (or 20) and insulates the source 28 and drain 30 from the gate 32. The vias 34, however, provide conductive access to the source 28, drain 30, and gate 32. The circuit 18 can also be selectively etched to achieve a desired pattern. Alternatively, the circuit 18 is comprised of printable polymers that are printed or pattern with selective etching onto a second substrate 20, as shown in FIG. 2, and electrically coupled to the first and second electrodes 14, 16 by use of adhesives, conductive vias, capacitive coupling, or other suitable means of providing electrical connections between the circuit 18 and the first and second electrodes 14, 16.

Figure 4:
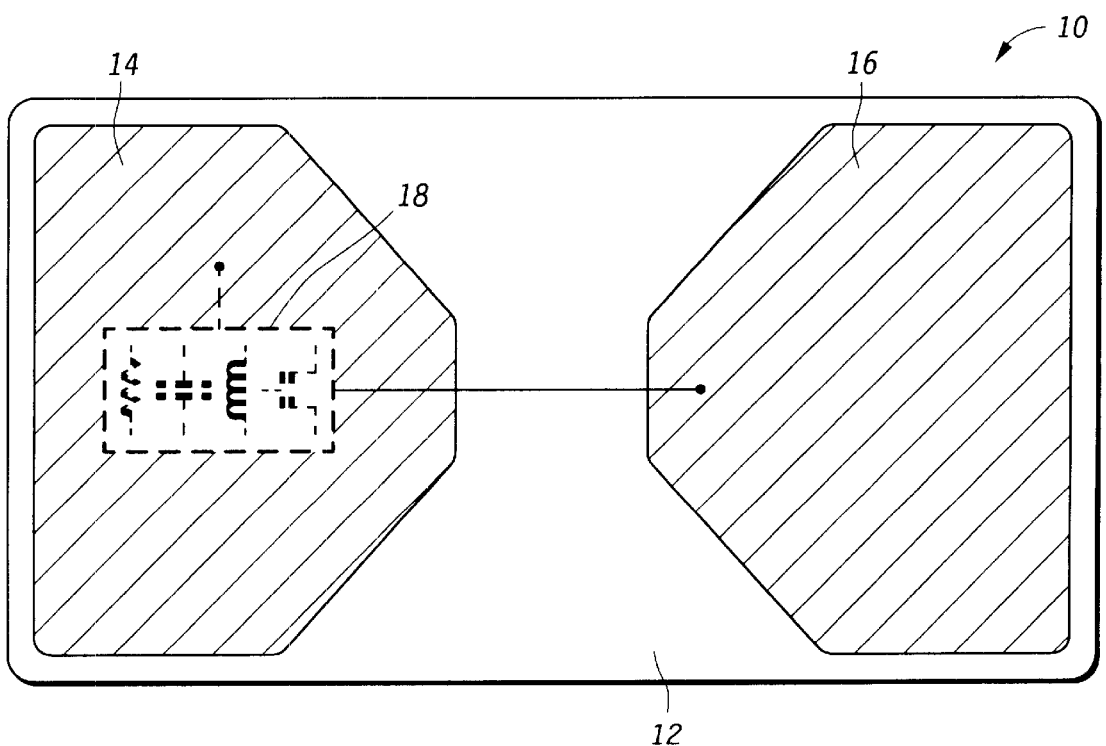
FIG. 4 is a plan view of the RFID device in accordance with an alternative embodiment of the present invention.

FIG. 4 shows an alternative embodiment of device 10. As will be appreciated by those skilled in the art, circuit 18 need not be physically located between the first and second electrodes 14, 16 as shown in FIG. 1. Circuit 18 may assume several alternate positions, like that shown in FIG. 4, so long as there is appropriate electrical isolation between circuit 18 and the first and second electrodes 14, 16. Moreover, it will be appreciated by those skilled in the art that circuit 18 may comprise silicon and/or polymers. Furthermore, it will also be appreciated by those skilled in the art that the first and second electrodes may be comprised of conductive polymers, conductive inks, graphite, carbon, ferrophosphide, materials as articulated above, or the like.

As discussed herein, a wide variety of non-conductive materials can be used for substrate 12. Likewise, a wide variety of conductive materials can be used for first and second electrodes 14, 16. Moreover, a wide variety of polymer-based materials can be used for circuit 18.

In operation, an exciter source (not shown, e.g., a reader) generates a signal that is capacitively coupled to circuit 18. The signal generated by the excited powers circuit 18, and in response, circuit 18 generates a signal that is capacitively coupled over the air to a reader (not shown) via electrodes 14, 16. The reader reads the signal to decode the information for use. The signal generated by the exciter source can contain a power up signal as described above or it can contain data to be written to or acted upon by circuit 18. For example, if the signal from the exciter source includes data that is to be written to the circuit 18, circuit 18 derives power from the signal as is known in the art, writes the appropriate data into memory, and may optionally generate a signal that is capacitively coupled over the air to the reader (not shown) via the electrodes 14, 16.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A capacitively powered radio frequency identification (RFID) device comprising:
   a substrate;
   a conductive pattern formed on the substrate, the conductive pattern having a first electrode and a second electrode, the first and second electrodes being isolated from each other by a non-conductive region disposed therebetween; and
   a circuit, comprising polymers, electrically coupled to the first electrode and the second electrode, wherein at least a portion of the circuit is printed onto the substrate.

2. The capacitively powered RFID device of claim 1 wherein the circuit comprises a memory.

3. The capacitively powered RFID device of claim 2 wherein the memory is programmable.

4. The capacitively powered RFID device of claim 2 wherein the memory is printed onto the substrate.

5. The capacitively powered RFID device of claim 1 wherein the circuit comprises a transistor having conductive and insulating regions, the conductive and insulating regions comprising polymers.

6. The capacitively powered RFID device of claim 1 wherein the circuit comprises discrete components having conductive and insulating regions, the conductive and insulating regions comprising polymers.

7. The capacitively powered RFID device of claim 6 wherein the polymer is selected from the group consisting of: carbon nanotubes, carbon fullerenes, a conjugated semiconducting polymer, a high-density pi-bond organic oligomer, self-assembled nanoparticles, and a ceramic filled polymer dielectric.

8. The capacitively powered RFID device of claim 1 wherein the circuit is patterned with selective etching.

9. The capacitively powered RFID device of claim 1 wherein the conductive pattern is formed from a material selected from a group consisting of: conductive polymers, conductive inks, graphite, carbon, and ferrophosphide.

10. The capacitively powered RFID device of claim 1 wherein the substrate is selected from a group consisting of: a polymer-based substrate, a non-polymer based substrate, an organic substrate, and an inorganic substrate.

11. The capacitively powered RFID device of claim 1 wherein the circuit comprises silicon.

12. A capacitively powered radio frequency identification (RFID) device comprising:
    a first substrate;
    a conductive pattern formed on the first substrate, the conductive pattern having a first electrode and a second electrode, the first and second electrodes being isolated from each other by a non-conductive region disposed therebetween; and
    a circuit, comprising polymers, printed on a second substrate and electrically coupled to the first electrode and the second electrode.

13. A capacitively powered radio frequency identification (RFID) device comprising:
    a first substrate;
    a conductive pattern formed on the first substrate, the conductive pattern having a first electrode and a second electrode, the first and second electrodes being isolated from each other by a non-conductive region disposed therebetween; and
    a circuit, comprising polymers, patterned with selective etching on a second substrate and electrically coupled to the first electrode and the second electrode.

14. A method of manufacturing a capacitively powered radio frequency identification ("RFID") device, the method comprising the steps of:
    providing a substrate;
    forming a conductive pattern on the substrate, the conductive pattern having a first electrode and a second electrode, the first and second electrodes being isolated from each other by a non-conductive region disposed therebetween;
    printing at least a portion of an integrated circuit comprising polymer material onto the substrate; and
    electrically coupling the integrated circuit, comprising polymers, to the first electrode and the second electrode.

15. A method of manufacturing a capacitively powered radio frequency identification ("RFID") device, the method comprising the steps of:
    providing a substrate;
    forming a conductive pattern on the substrate, the conductive pattern having a first electrode and a second electrode, the first and second electrodes being isolated from each other by a non-conductive region disposed therebetween;
    securing an integrated circuit comprising polymer material onto the substrate by selectively etching a polymer pattern; and
    electrically coupling the integrated circuit, comprising polymers, to the first electrode and the second electrode.

* * * * *